May 19, 1942. H. A. LINES 2,283,745
REGULATING DEVICE FOR FURNACES OR THE LIKE
Filed Oct. 5, 1939
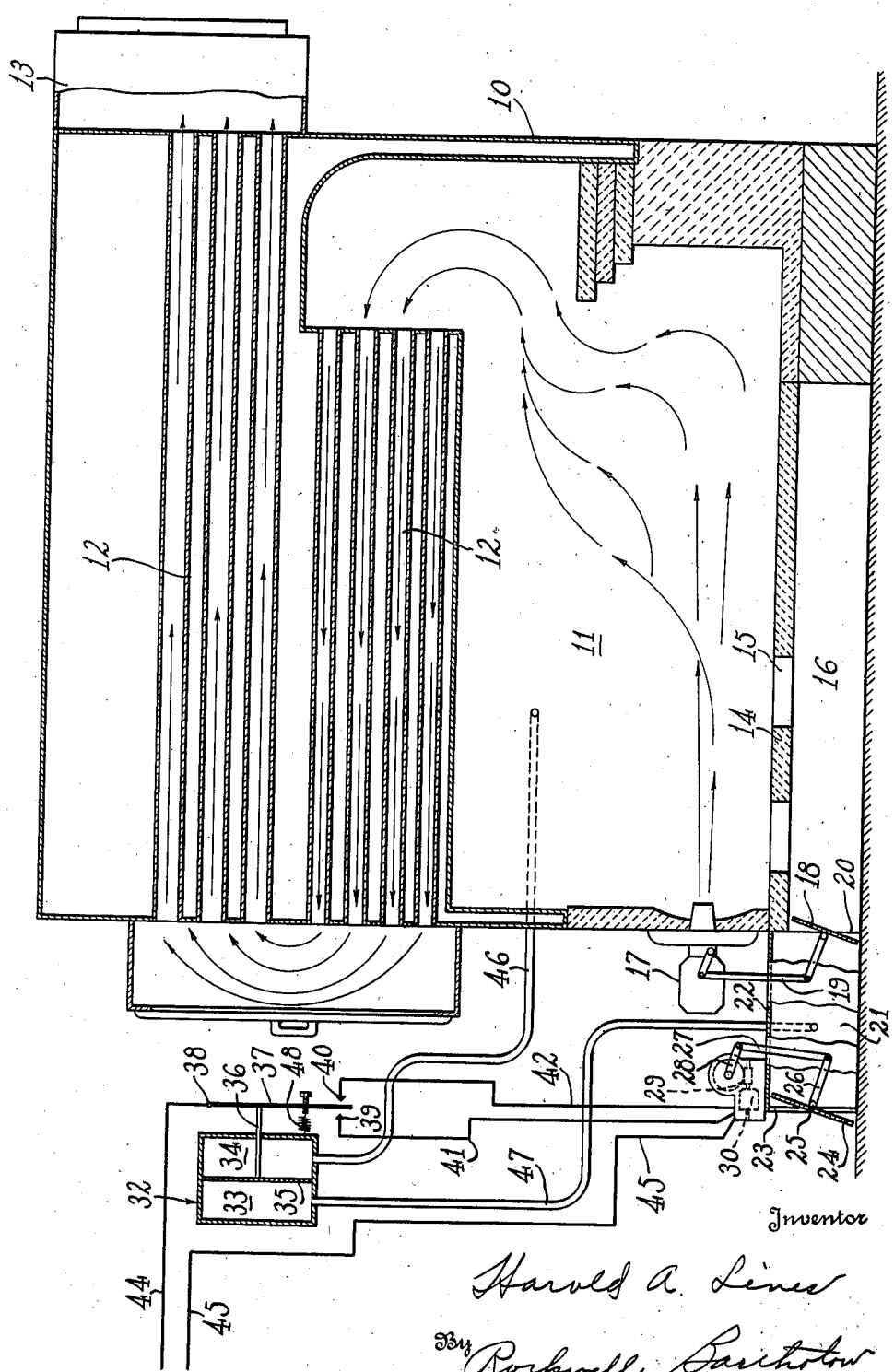
Inventor
Harold A. Lines
By Rockwell & Barthrow
Attorneys Patented May 19, 1942

2,283,745

UNITED STATES PATENT OFFICE 2,283,745

REGULATING DEVICE FOR FURNACES OR THE LIKE

Harold A. Lines, West Haven, Conn., assignor of one-half to Albert G. Purdue, New Haven, Conn.

Application October 5, 1939, Serial No. 298,023

4 Claims. (Cl. 110—72)

This invention relates to a device for regulating the flow of air or other gases into an enclosed vented chamber, and more particularly to a regulating or controlling device whereby the supply of combustion air to a furnace may be controlled in a satisfactory manner, so that not only will the requisite amount of oxygen be supplied for the proper combustion of the fuel, regardless of the amount of fuel being consumed at any time, but also so that the building up of an excess pressure within the combustion chamber will be avoided.

In practically all furnaces, and particularly so-called automatic furnaces, such, for example, as oil-burning furnaces, where the burner must supply a relatively great amount of heat, some means is employed for controlling the amount of air supplied to the combustion chamber for proper combustion of the fuel. This air is supplied through a draft opening, and its amount for a given size of opening will depend upon the difference between the pressure existing in the combustion chamber, whether above or below atmospheric pressure, and the pressure of the air supply. In other words, the mass of the air delivered to the furnace depends on this differential and the size of the draft opening, the differential referred to being the pressure which determines the velocity of the air flow.

When the air is supplied under atmospheric pressure or gravity, the amount of air supplied to the combustion chamber will depend, of course, upon the size of the draft damper opening, and the reduced pressure or amount of vacuum within the combustion chamber, as that upon the outside of the furnace, will be equal to atmospheric pressure. In any case, the pressures existing within the combustion chamber and without the furnace vary with atmospheric conditions, and with conditions within the chamber.

However, if this differential, that is, the difference in pressure between the pressure in the combustion chamber and that of the air supply, may be kept constant, then the amount of air supplied to the furnace may be closely regulated by the opening and closing of the draft damper, that is, by varying the effective size of the draft opening. In such case the amount of draft air supplied can be regulated exactly according to the amount of fuel being supplied, so as to provide for the proper combustion of the fuel without an excess of either fuel or air. Therefore, in respect to the control of air supply to the chamber, this differential of the pressures within and without the combustion chamber is perhaps of more importance than the actual pressures themselves.

Various devices in the past have been suggested for regulating the pressure within the combustion chamber of a furnace and regulating the amount of air supplied thereto. Many of such devices, however, have failed to take into consideration the pressure differential referred to above, and in addition the pressure in the combustion chamber is generally regulated by regulation of the pressure in the outlet pipe, that is, the pipe leading to the smokestack where the products of combustion are released. There is a distinct disadvantage in such regulation, as, for example, the closing of a damper in the outlet pipe of the furnace often unduly restricts this outlet when the supply of fuel is suddenly increased, so that an unduly high pressure is built up in the combustion chamber, and a "blowback" results, exhausting the products of combustion into the area surrounding the furnace, instead of into the smokestack.

One object of the present invention is to overcome the disadvantages above referred to, and, at the same time, to provide means for effectively regulating the combustion air supplied to a furnace by the difference between the air pressures existing upon opposite sides of the draft damper.

A still further object of the invention is the provision of a device for regulating the air supplied to a furnace in accordance with the differential of pressure on opposite sides of the draft damper by regulating the pressure of the air supply upon the side of this damper opposite that of the combustion chamber.

A still further object of the invention is the provision of means for regulating the combustion air supplied to a furnace in accordance with the amount of fuel to be consumed by providing a draft damper through which the air flows to the combustion chamber, and providing upon the supply side of this damper an auxiliary chamber, and controlling the pressure existing within the auxiliary chamber to maintain a constant pressure differential between this auxiliary chamber and the combustion chamber.

To these and other ends the invention consists in the novel features and combinations of parts to be hereinafter described and claimed.

In the accompanying drawing the figure is a diagrammatic view partly in section of a furnace embodying my improvements.

To illustrate a preferred embodiment of my invention, I have shown a furnace designated generally by the numeral 10. It will be understood that the invention is applicable to any type of furnace, regardless of the kind of fuel employed, and that the particular embodiment shown is merely by way of illustration of the invention, and should not be considered as a limitation of the principles of the invention. As shown, the furnace comprises a combustion chamber 11, boiler sections 12, through which the hot gases pass to the outlet 13 and thence to the smokestack (not shown). Below the combustion chamber means is provided for diffusing combustion air passing into the chamber, which in this instance is the usual fuel bed or checkerwork 14, having openings 15 through which combustion air passes to the chamber 11 from the air chamber or inlet area 16, disposed below the checkerwork 14.

Fuel may be supplied to the combustion chamber in any desired manner, such, for example, as by an oil burner of usual form, shown diagrammatically at 17, and entrance of combustion air to the chamber 16 below the checkerwork may be controlled by a pivoted door or damper 18. A linkage 19 connects this door with the oil burner so that it may be moved toward full open or full closed position in accordance with the amount of fuel being supplied to the combustion chamber. In this manner the effective size of the opening 20 leading into the chamber 16 may be controlled in accordance with the amount of fuel being consumed, and such control will take place automatically as the amount of such fuel is increased or decreased. It will be seen, therefore, that with the effective area of the opening 20 being varied according to variations in the fuel supply, it will be only necessary to maintain a constant pressure differential between that obtaining on opposite sides of the damper 18 in order that the amount of air supplied to the furnace will be also varied in proportion to the fuel which is being supplied.

To effect this result, and to effect it entirely independently of any regulation of the gases leaving the furnace through the outlet 13, I have provided in front of the opening 20 an auxiliary chamber 21, which may be enclosed within any suitable casing 22. At one end of this chamber is an air supply opening 23 the effective size of which is controlled by a movable door or damper 24 pivoted at 25. This damper is connected by links 26 and 27 with a crank arm 28, which crank arm is adapted to be oscillated by suitable reduction gearing, shown diagrammatically at 29, the gearing being in turn driven by a reversible electric motor 30. It will be apparent that oscillation of the crank arm 28 in opposite directions will serve to move the door or damper 24 toward open and closed positions.

In order that the movement of this door may be controlled according to the difference between the pressure obtaining in the combustion chamber and that obtaining in the auxiliary chamber 21, there is provided a regulator, shown more or less diagrammatically at 32. This regulator is divided into two chambers 33 and 34 by a diaphragm 35, which diaphragm is connected by a link 36 with a switch member 37 pivoted at the point 38.

The switch member 37 is designed to make contact with either one of two switch contacts 39 or 40, these contacts being connected to conducting wires 41 and 42 leading to the motor 30. A wire 44 is connected to the switch member 37, and a second wire 45 leads to the motor; these two wires forming the circuit to conduct the current to the motor from a source of current supply, such as the usual house current.

A tube or conduit 46 leads from a point within the combustion chamber to the chamber 34, while a tube 47 leads from the auxiliary chamber 21 to the chamber 33, in order that the pressure in each of these chambers will be the same as that within the combustion chamber or auxiliary chamber to which they are connected, and it will be apparent that the diaphragm 35 will be moved to the right or left according to any change in the differential between the pressures obtaining in the chambers 11 and 21.

It will be understood that the diaphragm 35 is initially set to occupy such a position as to hold the switch 37 in a neutral position for a certain pressure differential in the chambers 33 and 34. This may be accomplished by means of an adjustable spring 48 tending to draw the switch toward the left, as shown in the drawing. If this pressure differential becomes greater than that for which the diaphragm 35 is set, the switch 37 will be moved against the contact 40, thus effecting actuation of the motor 30 to rotate the arm 28 in a direction to move the draft door 24 toward its closed position so as to cause a decrease in pressure within the chamber 21, and thus restore the pressure differential to normal. If, howevr, the pressure differential between the chambers 33 and 34 falls below that for which the diaphragm 35 is set, the switch 37 will be moved in the opposite direction by the spring to engage the contact 39 and supply current through the wire 41 to the motor. This will drive the motor 30 in the opposite direction and effect a movement of the draft door 24 toward its open position, so as to again increase the pressure within the chamber 21. It will, therefore, be seen that a constant differential in pressure will always be maintained between the combustion chamber 11 and the auxiliary chamber 21, and as it is this differential in pressure that controls the driving of the draft air through the opening 20 into the chamber 16 below the checkerwork 14, the amount of air supplied to the combustion chamber will be in exact accordance with the effective area of the opening 20, as controlled by the draft door 18. As this draft door is regulated in accordance with the amount of oil consumed, the supply of air will be in exact accordance with requirements.

Moreover, this result is effected without choking the outlet of the combustion gases from the combustion chamber, and without varying the pressure within the combustion chamber, which pressure, due to natural conditions, will generally be lower than atmospheric pressure, as is necessary and desirable for the proper operation of the furnace.

It will also be understood that combustion air will be supplied to the chamber 21 through the opening 23 either by a positive source of air supply, such as a blower, or merely by gravity, without the use of any positive air-forcing device.

It will be understood that, although my invention is illustrated and described in connection with a furnace, it is applicable to any situation where it is desired to control the admission of a fluid into a chamber by means responsive to the difference between the pressure obtaining in the chamber and that obtaining in a second chamber intermediate the first and a source of fluid supply.

While I have shown and described a preferred embodiment of my invention, it will be understood that it is not to be limited to all of the details shown, but is capable of modification and variation within the spirit of the invention and within the scope of the appended claims.

What I claim is:

1. In a controlling device for a furnace having a combustion chamber and checkerwork below said chamber, an air chamber below said checkerwork, an auxiliary chamber having an opening leading into said air chamber, a closure member movable to vary the effective size of said opening, said auxiliary chamber having a second opening through which air is admitted thereto, means to control the quantity of air so admitted, said means comprising a closure member movable to vary the effective size of said opening, actuating means for said closure member, and means to control said actuating means, said controlling means comprising a diaphragm one side of which is exposed to pressure in the combustion chamber and the other side to pressure obtaining in the auxiliary chamber, and connections between said diaphragm and said actuating means whereby the difference in the pressures obtaining in said combustion chamber and said auxiliary chamber are maintained at a constant value.

2. In a controlling device for a furnace having a combustion chamber, a second chamber having an opening leading into the combustion chamber, a closure member movable to vary the effective size of said opening, said second chamber having a second opening through which air is admitted thereto, means to control the quantity of air so admitted, said means comprising a governing member having a portion thereof exposed to pressure in the combustion chamber, and an opposing portion thereof exposed to pressure in said second chamber whereby the position of said member is controlled by the difference in the pressures obtaining in the combustion chamber and said second chamber, a second closure member for varying the effective size of said second opening, and means operatively conecting said governing member to said second closure member.

3. In a controlling device for a furnace having a combustion chamber, a second chamber having an opening leading into the combustion chamber, a closure member movable to vary the effective size of said opening, said second chamber having a second opening through which air is admitted thereto, means to control the quantity of air so admitted, said means comprising a closure member movable to vary the effective size of said last-named opening, actuating means for said closure member, said actuating means comprising a governing member having a portion thereof exposed to pressure existing in the combustion chamber and an opposing portion thereof exposed to pressure existing within said second chamber, whereby said governing means is actuated in turn by changes in the difference in pressures obtaining in said combustion chamber and said second chamber and said difference may be maintained at a constant value.

4. In a control device for a furnace having a combustion chamber, an auxiliary chamber from which air passes to the combustion chamber, a damper controlling the effective area of such passage, means regulating said damper in accordance with the supply of fuel to the combustion chamber, said auxiliary chamber having an air inlet, a second damper controlling the effective area of said inlet to control the pressure obtaining in the auxiliary chamber, a pressure-actuated governing member for said second damper, and conduit means leading from the opposite sides of said governing member to opposite sides of said first damper respectively, whereby said second damper is controlled by the difference in pressures obtaining on opposite sides of said first damper, and said difference is maintained at a constant value.

HAROLD A. LINES.